M. BARNETT & L. BURGESS.
ART OF PRODUCING ALUMINUM CARBID.
APPLICATION FILED DEC. 18, 1916.

1,219,797.

Patented Mar. 20, 1917.

UNITED STATES PATENT OFFICE.

MAURICE BARNETT AND LOUIS BURGESS, OF NEW YORK, N. Y.

ART OF PRODUCING ALUMINUM CARBID.

1,219,797.  Specification of Letters Patent.  Patented Mar. 20, 1917.

Application filed December 18, 1916. Serial No. 137,714.

*To all whom it may concern:*

Be it known that we, MAURICE BARNETT and LOUIS BURGESS, citizens of the United States, residing at New York, in the county of New York and State of New York, have invented or discovered certain new and useful Improvements in the Art of Producing Aluminum Carbid, of which the following is a specification, reference being had therein to the accompanying drawing.

This invention relates to a method or process for producing aluminum carbid, by electrically heating, in a suitable electric furnace, a mixture or charge of alumina (or an oxygenated ore of aluminum, such as bauxite) and carbon, or a petroleum residue containing alumina and carbon, in which mixture or residue the carbon is present in an amount in excess of that theoretically necessary to reduce the alumina to metal. In thus subjecting such a mixture or charge to electric heat of suitable intensity portions of said mixture or charge are brought within a zone of high temperature and great chemical activity, and this zone can be maintained between the extremities of the electrodes, and which extremities will extend into the mixture or charge. As the production of the aluminum carbid progresses the receptacle containing the mixture or charge is gradually moved away from the electrodes, or the electrodes may be gradually moved relative to the receptacle, so that different portions of the mixture or charge will be acted upon in this zone of high temperature and great chemical activity.

Figure 1:
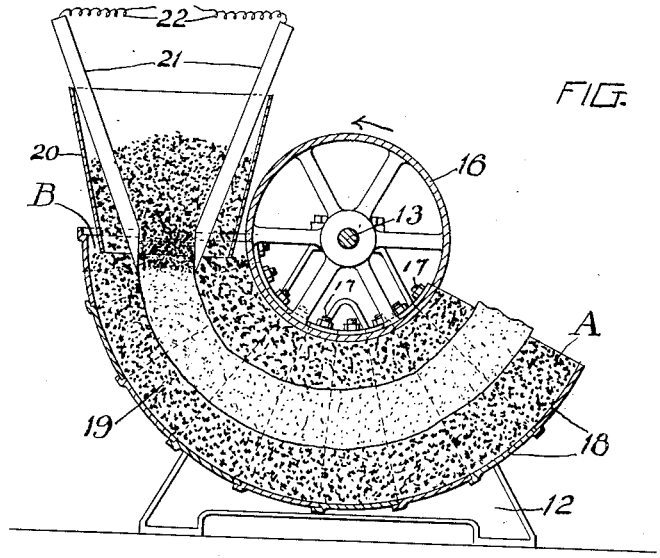
Figure 2:
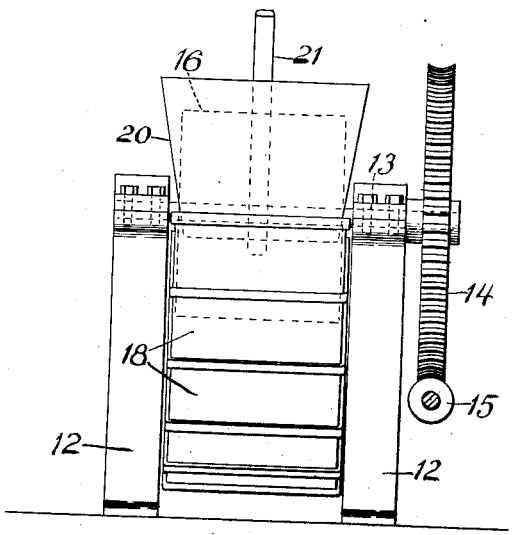

In the accompanying drawing Figure 1 illustrates, in vertical section, a suitable form of electric furnace or apparatus by which our invention may be carried into effect, and Fig. 2 is an elevation of the same.

Referring to the drawing, 12 denotes standards having at their tops suitable bearings for a shaft 13 provided with a worm wheel 14 meshing with a worm 15 by which said shaft may be slowly rotated. Fixed to the shaft 13 is a cylinder 16 to which are removably attached, in any suitable manner, as by bolts 17, a series of overlapping plates 18 which are bent into suitable shape to provide a receptacle for the charge 19 consisting, as hereinbefore stated, of a mixture or charge of alumina (or an oxygenated ore of aluminum) and carbon, or a petroleum residue containing alumina and carbon, in which mixture or residue the carbon is present in an amount in excess of that theoretically necessary to reduce the alumina to metal. This mixture or charge may be fed into the receptacle formed by the plates 18 and cylinder 16 by any convenient means as by a hopper 20. Suitably supported, so that their lower ends will extend into the mixture or charge 19, are electrodes 21 (preferably of graphitized carbon) connected with suitable electric conductors 22 so that a current of electricity, direct or alternating, may be caused to pass between the said electrodes through the charge or mixture of alumina and carbon in the receptacle, thus heating portions of said mixture between the proximate ends of the electrodes to a high temperature of about 2000° centigrade.

By bringing this mixture or charge within the zone of high temperature and great chemical activity between the proximate ends of the electrodes, portions of the mixture or charge will be acted upon and will be converted into aluminum carbid, and as the process continues the receptacle may be slowly rotated by the worm gear referred to and successive portions of the mixture or charge will thus be brought into this zone of high temperature and great chemical activity. As the operation progresses the plates 18 may be successively removed from the end A of the slowly rotating receptacle and be replaced at the end B of said receptacle, and portions of the core of aluminum carbid formed in the receptacle may be successively removed from the discharge end $a$ of the receptacle and fresh portions of the mixture or charge 19 may be supplied to the entering end $b$ of said receptacle.

Instead of moving the receptacle and its charge away from the electrodes, a stationary receptacle may be employed and a relative movement of the receptacle and electrodes may be effected, as the operation progresses, by slowly lifting the said electrodes, as will be understood.

By disposing the electrodes as shown, so that only the central portion of the mixture or charge in the slowly rotating receptacle will be acted upon, a sufficient portion of the charge, outside of this central part, will be unaffected by the electric current, due to its poor electrical conductivity, and will serve to protect the walls of the receptacle or furnace, so that no protecting lining for said walls will be necessary. This portion of the material not converted into aluminum carbid, will be successively removed from the end A of the receptacle and may be returned to the furnace for further treatment.

It will be understood that any suitable electric furnace may be employed in practising our process, and that the apparatus herein shown and described is only one form of apparatus by which our invention may be carried into effect.

By employing an amount of carbon in excess of the amount necessary for the reduction of the alumina to metal, but not so much as would be required for the production of straight aluminum carbid, it will be possible to form, with the aluminum carbid, varying amounts of metallic aluminum which may be desirable in certain operations, as e. g. in the manufacture of aluminum chlorid by the process set forth in our U. S. application, Serial No. 114,813, filed August 14, 1916.

The size of the furnace or apparatus for the production of aluminum carbid, the strength of electric current employed, etc., will depend on the amount of aluminum carbid to be produced. In practising our process we have employed an electric current of fifteen volts and of a density of fifteen hundred amperes, with electrodes forty inches long and three inches in diameter.

In carrying out our invention we take alumina or an oxygenated ore of aluminum and grind this to about 8-mesh. We similarly grind the carbon (which may consist of petroleum coke) to the same mesh and then mix the constituents thoroughly, using an amount of carbon in excess of that which would be required to reduce the alumina to metal. Care should be exercised not to use carbon that is too finely ground as it is apt to sift away from the charge or be carried away by the ejected gases. The mixture we have used has consisted of approximately two parts of alumina to one part of carbon.

If petroleum residues containing alumina and carbon are employed we may add additional alumina or carbon, as the case may be, to produce a mixture in which the carbon is present in an amount in excess of that which would be necessary to reduce the alumina to metal. The residues may then be ground to about 8-mesh.

In speaking of "petroleum residues" we have in mind those residues obtained when petroleum is distilled with aluminum chlorid. As the result of such distillation certain tarry or carbonaceous residues are left which contain alumina or aluminum chlorid, probably in combination with asphaltic matter. The aluminum chlorid may be decomposed by treating the residues with water and heating which has the effect of hydrolyzing the aluminum chlorid with the production of gaseous hydrochloric acid and alumina. By drying and calcining the mass a residue may be obtained suitable for the production of aluminum carbid after the constituents, i. e. the alumina and carbon, have been brought into the proper proportions by suitable additions of one or the other constituent.

In the practice of our process the mixture or charge is placed in the receptacle up to or slightly above the level of the bottom ends of the electrodes. A small carbon rod, say one inch in diameter, is then placed directly under, and in contact with the electrodes, to establish the circuit, and simultaneously act as a resistance. Direct or alternating electric current of suitable strength is then applied and the carbon rod is brought to a white heat, thus commencing the operation which will continue after said rod is moved away from the electrodes. Additional portions of the mixture or charge are then fed into the receptacle above the now white-hot carbon rod, whereupon the heat of the rod will be communicated to the mixture or charge contiguous thereto with the result that a portion of the charge will be heated to the degree at which aluminum carbid will be formed. As the mixture or charge is heated its electrical conductivity increases and soon a considerable amount of the mixture or charge between the electrodes may be brought to a temperature of about 2000° centigrade, at which temperature aluminum carbid will be formed. The process will then be continued as hereinbefore explained.

Having thus described our invention or discovery, we claim and desire to secure by Letters Patent:

1. The herein described process for producing aluminum carbid consisting in electrically heating portions of a mixture or charge of alumina and carbon to a temperature below the temperature of the electric arc, but not below approximately 2000° C., by means of electrodes extending into said mixture or charge.

2. The herein described process for producing aluminum carbid consisting in electrically heating portions of a mixture or charge of alumina and carbon to a temperature of approximately 2000° C., by means of electrodes extending into said mixture or charge.

3. The herein described process for producing aluminum carbid consisting in electrically heating portions of a mixture or charge of alumina and carbon to a temperature below the temperature of the electric arc, but not below approximately 2000° C., by means of electrodes extending into said mixture or charge, the amount of carbon in said mixture or charge being in excess of that necessary to reduce the alumina to metal.

4. The herein described process for producing aluminum carbid consisting in electrically heating portions of a mixture or charge of alumina and carbon to a temperature of approximately 2000° C., by means of electrodes extending into said mixture or charge, the amount of carbon in said mixture or charge being in excess of that necessary to reduce the alumina to metal.

5. The herein described process for producing aluminum carbid consisting in electrically heating portions of a mixture or charge, comprising approximately two parts of alumina to one part of carbon, to a temperature below the temperature of the electric arc but not below approximately 2000° C., by means of electrodes extending into said mixture or charge.

6. The herein described process for producing aluminum carbid consisting in electrically heating portions of a mixture or charge, comprising approximately two parts of alumina to one part of carbon, to a temperature of approximately 2000° C., by means of electrodes extending into said mixture or charge.

7. The herein described process for producing aluminum carbid, consisting in acting upon a mixture or charge of alumina and carbon by passing an electric current of suitable strength through successive portions of said mixture or charge by means of electrodes extending into the same, the strength of the electric current being such that successive portions of said mixture or charge will be heated to a temperature of approximately 2000° C., or above, but in no event to the temperature of the electric arc.

8. The herein described process for producing aluminum carbid, consisting in acting upon a mixture or charge of alumina (or an oxygenated ore of aluminum, as bauxite) and carbon, or a petroleum residue containing alumina and carbon, by passing an electric current of suitable strength through successive portions of said mixture or charge, the strength of the electric current being such that successive portions of said mixture or charge will be heated to a temperature of approximately 2000° C. or above, but in no event to the temperature of the electric arc, the proximate ends of the electrodes, between which the electric current passes in heating the mixture or charge, being extended into the said mixture or charge, causing a gradual relative movement of said mixture or charge and the electrodes, and supplying new portions of the mixture or charge as portions thereof are converted into aluminum carbid.

In testimony whereof we affix our signatures.

MAURICE BARNETT.
LOUIS BURGESS.